US012755364B2

(12) United States Patent
Peng et al.

(10) Patent No.: US 12,755,364 B2
(45) Date of Patent: Oct. 6, 2026

(54) METHOD FOR PROCESSING SAMPLE DATA, ELECTRONIC DEVICE AND STORAGE MEDIUM

(71) Applicants: ZHEJIANG HENGYI PETROCHEMICAL CO., LTD., Hangzhou (CN); ZHEJIANG HENGYI HIGH-TECH MATERIALS CO., LTD., Hangzhou (CN)

(72) Inventors: Xiantao Peng, Hangzhou (CN); Peng Wang, Hangzhou (CN); Dake Li, Hangzhou (CN); Yaobin Zhang, Hangzhou (CN); Huitao Fan, Hangzhou (CN); Feng Xu, Hangzhou (CN)

(73) Assignees: ZHEJIANG HENGYI PETROCHEMICAL CO., LTD., Hangzhou (CN); ZHEJIANG HENGYI HIGH-TECH MATERIALS CO., LTD., Hangzhou (CN)

( * ) Notice: Subject to any disclaimer, the term of this patent is extended or adjusted under 35 U.S.C. 154(b) by 302 days.

(21) Appl. No.: 18/618,871

(22) Filed: Mar. 27, 2024

(65) Prior Publication Data

US 2025/0086776 A1 Mar. 13, 2025

(30) Foreign Application Priority Data

Sep. 11, 2023 (CN) ......................... 202311166776.6

(51) Int. Cl.
*G06T 7/00* (2017.01)
*G06V 10/44* (2022.01)
(Continued)

(52) U.S. Cl.
CPC ............ *G06T 7/0004* (2013.01); *G06V 10/44* (2022.01); *G06V 10/762* (2022.01);
(Continued)

(58) Field of Classification Search
CPC .... G06V 10/44; G06V 10/762; G06V 10/764; G06V 10/774; G06V 20/50;
(Continued)

(56) References Cited

FOREIGN PATENT DOCUMENTS

| | | | | |
|---|---|---|---|---|
| CN | 109544549 A | * | 3/2019 | ....... G06F 18/24147 |
| CN | 109558852 A | * | 4/2019 | ............. D01D 13/02 |

(Continued)

OTHER PUBLICATIONS

K. Neshatpour, F. Behnia, H. Homayoun and A. Sasan, "ICNN: an iterative implementation of convolutional neural networks to enable energy and computational complexity aware dynamic approximation," 2018 Design, (DATE), Dresden, Germany, 2018, pp. 551-556, doi: 10.23919/DATE.2018.8342068. (Year: 2018).*

(Continued)

*Primary Examiner* — Sumati Lefkowitz
*Assistant Examiner* — Paulo Andres Garcia
(74) *Attorney, Agent, or Firm* — Banner & Witcoff, Ltd.

(57) ABSTRACT

Provided is a method for processing sample data, an electronic device and a storage medium, relating to the field of artificial intelligence technology, and especially to the fields of image processing and computer vision. The method includes: obtaining a plurality of first working images of a spinning box; for each first working image in the plurality of first working images, determining the first working image as a defect image of the spinning box when a difference between the first working image and a normal image of the spinning box meets a first condition; and obtaining a first sample data set based on all defect images in the plurality of first working images.

12 Claims, 3 Drawing Sheets

(51) Int. Cl.
*G06V 10/762* (2022.01)
*G06V 10/764* (2022.01)
*G06V 10/774* (2022.01)
*G06V 20/50* (2022.01)

(52) U.S. Cl.
CPC .......... *G06V 10/764* (2022.01); *G06V 10/774* (2022.01); *G06V 20/50* (2022.01); *G06T 2207/20081* (2013.01); *G06T 2207/30124* (2013.01)

(58) Field of Classification Search
CPC ... G06V 2201/06; G06T 7/0004; G06T 7/001; G06T 2207/20081; G06T 2207/20084; G06T 2207/20132; G06T 2207/30164; G06T 2207/30124
See application file for complete search history.

(56) References Cited

FOREIGN PATENT DOCUMENTS

| | | | | | |
|---|---|---|---|---|---|
| CN | 109614911 | A | * | 4/2019 | G06V 20/52 |
| CN | 110175659 | A | * | 8/2019 | G06F 18/241 |
| CN | 210775245 | U | | 6/2020 | |
| CN | 111445459 | A | | 7/2020 | |
| CN | 113688889 | A | | 11/2021 | |
| CN | 215281920 | U | | 12/2021 | |
| CN | 114004818 | A | * | 2/2022 | G06N 3/045 |
| CN | 110175659 | B | | 4/2022 | |
| CN | 114998315 | A | * | 9/2022 | G06N 3/08 |
| CN | 115311540 | A | | 11/2022 | |
| CN | 115471476 | A | * | 12/2022 | G06T 7/001 |
| CN | 114757900 | B | | 4/2023 | |
| CN | 115984259 | A | | 4/2023 | |
| CN | 116152204 | A | | 5/2023 | |
| CN | 116188399 | A | | 5/2023 | |
| JP | 2017054239 | A | * | 3/2017 | |
| JP | 2021082154 | A | | 5/2021 | |

OTHER PUBLICATIONS

Gao, W.; Jiang, J.; Wang, X.; Li, W.; Zheng, G. State Recognition of Multi-Nozzle Electrospinning Based on Image Processing. Micromachines 2023, 14, 529. https://doi.org/10.3390/mi14030529 (Year: 2023).*

Noman Haleem, Matteo Bustreo, Alessio Del Bue, A computer vision based online quality control system for textile yarns, Computers in Industry, vol. 133, 2021, 103550, ISSN 0166-3615, https://doi.org/10.1016/j.compind.2021.103550. (Year: 2021).*

JP2024-147260—First Office Action and Translation.

JP2024-147260—Allowance and Translation.

EP24165435.9—European Extended Search Report.

CN202311166776.6—First Office Action and Translation dated Jun. 30, 2025.

* cited by examiner

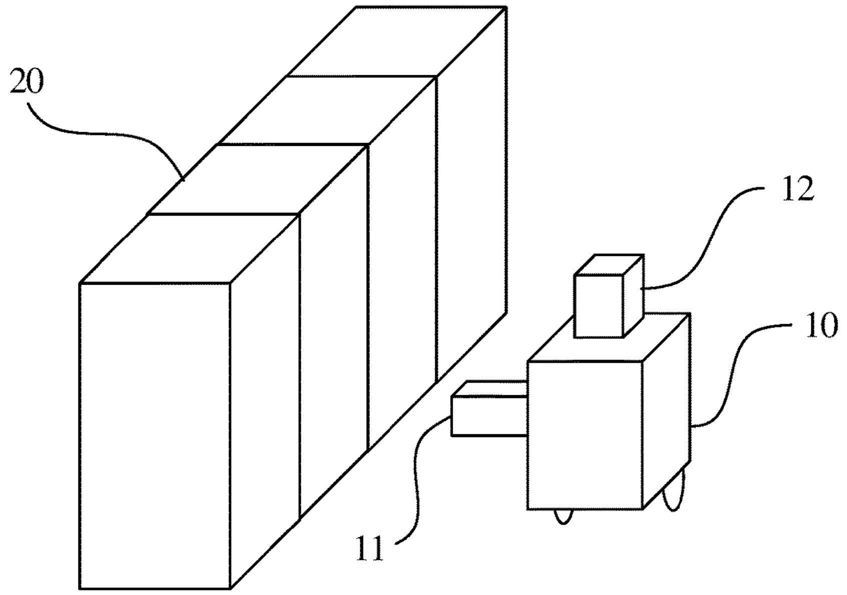

FIG. 1

S210

Obtaining a plurality of first working images of a spinning box

S220

For each first working image in the plurality of first working images, determining the first working image as a defect image of the spinning box when a difference between the first working image and a normal image of the spinning box meets a first condition

S230

Obtaining a first sample data set based on all defect images in the plurality of first working images; where the first sample data set is used to train to obtain a defect detection model of the spinning box, and the defect detection model is used to detect whether a second working image of the spinning box has a defect

FIG. 2

METHOD FOR PROCESSING SAMPLE DATA, ELECTRONIC DEVICE AND STORAGE MEDIUM

CROSS-REFERENCE TO RELATED APPLICATIONS

The present application claims priority to Chinese Patent Application No. CN202311166776.6, filed with the China National Intellectual Property Administration on Sep. 11, 2023, the disclosure of which is hereby incorporated herein by reference in its entirety.

TECHNICAL FIELD

The present disclosure relates to the field of artificial intelligence technology, and especially to the fields of image processing and computer vision.

BACKGROUND

In the chemical fiber industry, when the spinning box produces chemical fiber yarns, the raw materials for spinning are presented in the form of non-Newtonian fluid with a certain viscosity, and the long-term operation of the spinning box will cause too high machine temperature, so the anomalies such as end breakage of yarn wire, floating yarn, hooking yarn, tilt of oil nozzle, tilt of yarn guide hook, yarn wire being not in yarn guide hook, etc. may occur in the spinning box, and the spinning box needs to be inspected. The traditional inspection method is carried out manually, and has the disadvantages of low efficiency and high cost. In related technologies, a method of using the AI model for image detection is proposed to automatically identify the anomalies in the spinning box. However, the training of the model requires a large number of samples, and also requires manual collection of sample images. The frequency of occurrence of the anomalies in the spinning box is relatively low, and the abnormal areas such as floating yarn and hooking yarn are also more subtle and difficult to identify, due to the filamentous characteristic of the yarn itself. Therefore, the manual collection of sample images is very inefficient and error-prone.

SUMMARY

The present disclosure provides a method and apparatus for processing sample data, an electronic device and a storage medium, to solve or alleviate one or more technical problems in the prior art.

In a first aspect, the present disclosure provides a method for processing sample data, including:

- obtaining a plurality of first working images of a spinning box;
- for each first working image in the plurality of first working images, determining the first working image as a defect image of the spinning box when a difference between the first working image and a normal image of the spinning box meets a first condition; and
- obtaining a first sample data set based on all defect images in the plurality of first working images; where the first sample data set is used to train to obtain a defect detection model of the spinning box, and the defect detection model is used to detect whether a second working image of the spinning box has a defect.

In a second aspect, the present disclosure provides an apparatus for processing sample data, including:

- an image obtaining module configured to obtain a plurality of first working images of a spinning box;
- a defect image determining module configured to, for each first working image in the plurality of first working images, determine the first working image as a defect image of the spinning box when a difference between the first working image and a normal image of the spinning box meets a first condition; and
- a first sample processing module configured to obtain a first sample data set based on all defect images in the plurality of first working images; where the first sample data set is used to train to obtain a defect detection model of the spinning box, and the defect detection model is used to detect whether a second working image of the spinning box has a defect.

In a third aspect, provided is an electronic device, including:

- at least one processor; and
- a memory connected in communication with the at least one processor;
- where the memory stores an instruction executable by the at least one processor, and the instruction, when executed by the at least one processor, enables the at least one processor to execute the method of any embodiment of the present disclosure.

In a fourth aspect, provided is a non-transitory computer-readable storage medium storing a computer instruction thereon, and the computer instruction is used to cause a computer to execute the method of any embodiment of the present disclosure.

The beneficial effects of the technical solution provided in the present disclosure at least include: the defect image of the spinning box is obtained by comparing the first working image of the spinning box with the normal image, the first sample data set for training the defect detection model can be obtained from the defect image, the collection efficiency and accuracy of the sample data can be improved, the training efficiency and model accuracy of the defect detection model is correspondingly improved, and the accuracy of abnormal detection of the spinning box is improved.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

FIG. 1 is a schematic diagram of an application scenario of a method for processing sample data according to an embodiment of the present disclosure;

FIG. 2 is a schematic flowchart of a method for processing sample data according to an embodiment of the present disclosure;

DETAILED DESCRIPTION

Figure 3:
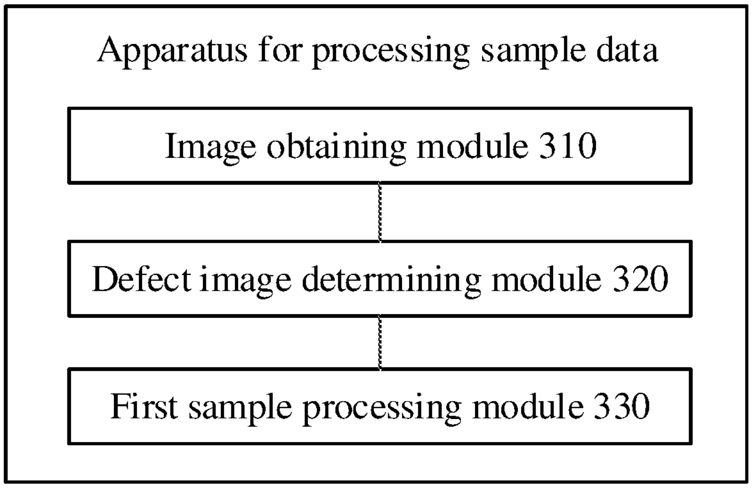
FIG. 3 is a schematic block diagram of an apparatus for processing sample data according to an embodiment of the present disclosure.

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

In order to facilitate understanding of the method for processing sample data in the embodiment of the present disclosure, the application scenario of this method are firstly described below as an example. FIG. 1 shows a schematic diagram of an exemplary application scenario of the method for processing sample data according to an embodiment of the present disclosure. This application scenario includes an inspection robot 10 deployed in the workshop, the inspection robot 10 may include an image acquisition device 11, and the image acquisition device 11 (such as webcam, camera, etc.) of the inspection robot 10 is used to collect working images of a spinning box 20.

The image acquisition device 11 can be connected to the processing device 12 and send a first working image of the spinning box 20 to the processing device 12. The processing device 12 is used to process the first working image of the spinning box 20 to obtain a first sample data set. The first sample data set is used to train a defect detection model of the spinning box 20. After obtaining the defect detection model, the image acquisition device 11 can be connected to the defect detection model and send a second working image of the spinning box 20 to the defect detection model. The defect detection model is used to detect the defect-related information of the second working image of the spinning box 20, and the defect-related information may include whether there is a defect, the detected defect type, and the confidence of each defect type. When the defect detection model detects that the second working image is defective, the mechanical arm of the inspection robot 10 can trigger a power supply of the spinning box 20 corresponding to the second working image, so that the spinning box 20 stops working and waits for maintenance. The mechanical arm of the inspection robot 10 can also trigger an alarm device on the spinning box 20 corresponding to the second working image, so that the spinning box 20 sends the alarm information to a user equipment. The alarm information can include the position, model, etc. of the spinning box 20.

According to the method of the embodiment of the present disclosure, the image acquisition device 11 and the processing device 12 of the inspection robot 10 are provided in this application scenario. The inspection robot 10 can obtain the defect-related information of the spinning box 20, and the inspection robot 10 can interact with the user equipment to send the defect-related information of the spinning box 20 to the user equipment, or realize various management functions related to the first sample data set.

Optionally, the above-mentioned processing device 12 may be provided in the inspection robot 10 or in a remote device. For example, the image acquisition device 11 and the processing device 12 may be deployed on the inspection robot 10 as shown in FIG. 1. Moreover, the processing device 12 may not be deployed on the inspection robot 10, that is, the inspection robot 10 may only be responsible for collecting images of the spinning box 20 and sending the images of the spinning box 20 to the processing device 12.

FIG. 2 shows a schematic diagram of a method for processing sample data according to an embodiment of the present disclosure. This method can be applied to an apparatus for processing sample data, and this apparatus can be deployed in an electronic device. The electronic device is, for example, a single-machine or multi-machine terminal, a server or other processing device. Here, the terminal may be a User Equipment (UE) such as a mobile device, a Personal Digital Assistant (PDA), a handheld device, a computing device, a vehicle-mounted device, a wearable device, etc. In some possible implementations, the method may also be implemented by the processor calling a computer-readable instruction stored in the memory. As shown in FIG. 1, the method may include the following steps S210 to S230.

Step S210: obtaining a plurality of first working images of a spinning box.

In an embodiment of the present disclosure, the first working images include images of one or more positions in the spinning box in the actual working state. Exemplarily, the first working images may include images at any at least one position among the spinneret, the yarn, the guide hook and the oil nozzle in the spinning box.

Exemplarily, the first working images may be obtained by shooting the spinning box by a inspection robot or a person in real time, or may be historical images of the spinning box in the database.

Exemplarily, the first working images may include normal images of the spinning box in the normal working state, and may also include defect images of the spinning box in the abnormal working state.

Step S220: for each first working image in the plurality of first working images, determining the first working image as a defect image of the spinning box when a difference between the first working image and a normal image of the spinning box meets a first condition.

In an embodiment of the present disclosure, the normal image includes an image of one or more positions in the spinning box during normal operation, and the position of the spinning box presented in the normal image is the same as or corresponds to the position of the spinning box presented in the first working image. For example, the first working image includes an image of the spinneret in the spinning box during operation (may be normal operation or abnormal operation, which needs to be judged), and then the normal image includes an image of the spinneret in the spinning box in the normal working state. For example, whether the image of the spinning box is a normal image can be judged from the quality of the chemical fiber produced by the spinning box. If the quality of the chemical fiber produced by the spinning box is relatively high, the image of the spinning box is a normal image. In practical applications, the normal images can be collected in advance to be applied in the above method.

Exemplarily, the pixels of the first working image can be compared with the pixels of the normal image, and the difference between the first working image and the normal image is obtained through the difference between the pixels of the first working image and the pixels of the normal image. Here, the pixels may be pixels at all positions in the image, or may be pixels at one or more positions in the image. For example, the pixels at the spinneret in the first working image and the normal image may be compared, to obtain the difference between the spinneret in the first working image and the spinneret in the normal image.

In an embodiment of the present disclosure, the first condition may be used to confirm whether the difference between the first working image and the normal image is obvious, or whether the difference is a defect of the first working image. Exemplarily, the first condition may be related to the sizes, number, locations, etc. of distinguishing positions. For example, the first condition may include: the number of pixels that are different between the first working image and the normal image is greater than a threshold (e.g., greater than 0, greater than 10, greater than 100, etc.), the area is greater than a threshold, etc.

Exemplarily, the first condition may be preset by the user, and the user may set a plurality of first conditions for a plurality of positions. The plurality of positions are, for example, the area to be cleaned on the spinneret, the floating yarn of the yarn wire, the position of the yarn guide hook, the position of the oil nozzle, etc.

In one implementation, the inspection robot can move to a preset position and shoot a plurality of spinning boxes to obtain the first working image and the normal image. The inspection robot moves to the preset position of each spinning box and has the same distance from each spinning box, so the first working image and the normal image have the same shooting angle and shooting distance, and the difference between the first working image and the normal image can be compared more intuitively.

Step S230: obtaining a first sample data set based on all defect images in the plurality of first working images; where the first sample data set is used to train to obtain a defect detection model of the spinning box, and the defect detection model is used to detect whether a second working image of the spinning box has a defect.

Exemplarily, each defect image in the first sample data set is used as an input image of a preset model, and is marked as defective. The input image and corresponding annotation information are used to train the preset model. When the preset model converges, the preset model can be determined as the defect detection model that can be applied to the actual defect detection process.

Optionally, the annotation information of the above-mentioned input image may also include the type of the defect, the position of the defect, and other information. The specific annotation process can be implemented manually or using an automated annotation tool.

In an embodiment of the present disclosure, the first sample data set may be used to train to obtain the defect detection model of the spinning box, and the defect detection model can be used to identify the second working image, to determine that the second working image is a normal image or a defect image. Optionally, the confidence of the normal image or defect image can also be obtained.

In an embodiment of the present disclosure, the second working image is used to represent the working state in which the spinning box is working. If the second working image obtained from the defect detection model is a normal image, then the spinning box is in the normal working state. If the second working image from the defect detection model is a defect image, the spinning box is in the abnormal working state, and the user can repair the spinning box in the abnormal working state. Exemplarily, the defect detection model can be a feature probability model or a neural network model based on deep learning, etc., and the second working image is obtained by shooting one or more spinning boxes by the inspection robot or person in real time, to detect the working states of one or more spinning boxes in real time.

Exemplarily, the first sample data set may include each defect image in the plurality of first working images, a partial image in each defect image, and an image obtained by clipping the background of the spinning box in each defect image or the above partial image.

As can be seen, according to the technical solution of the embodiment of the present disclosure, the defect image of the spinning box can be obtained by comparing the first working image of the spinning box with the normal image, and the first sample data set for training the defect detection model can be obtained from the defect image. Through the image comparison, there is no need to manually observe the spinning box for a long time, thus improving the efficiency of sample collection. Also, the abnormal area in the spinning box is subtle, so the comparison is performed by scanning the image. When the difference from the normal image meets a certain condition, this image can be judged as abnormal, which is more accurate than manual identification. Therefore, the above method can improve the collection efficiency and accuracy of the sample data, and accordingly improve the training efficiency and model accuracy of the defect detection model; and improve the accuracy of the defect detection model in detecting the second working image of the spinning box. As can be seen from the defect detection model, the second working image is a normal image or a defect image, so as to determine that the spinning box corresponding to the second working image is in the normal working state or abnormal working state in a timely and accurate manner, so that the user can be notified to repair the spinning box when the spinning box is in the abnormal working state, to avoid affecting the quality of the chemical fiber produced by the spinning box due to the abnormal work of the spinning box.

In some embodiments, the step of obtaining the first sample data set based on all defect images in the plurality of first working images may include:

- classifying all the defect images according to at least one defect type, to obtain at least one image set corresponding to the at least one defect type one by one; and
- obtaining the first sample data set based on the at least one image set.

Optionally, the at least one defect type includes at least one of defects of a spinneret, a yarn, a yarn guide hook and an oil nozzle in the spinning box. Specifically, at least one defect type may include the end breakage of yarn, floating yarn, hooking yarn, tilt of the oil nozzle, tilt of the yarn guide hook, the yarn being not in the yarn guide hook, etc. in the spinning box. For example, there are many objects to be cleaned on the spinneret, there is floating yarn on the yarn, the position of the yarn guide hook is tilted, the position of the oil nozzle is tilted, etc. Exemplarily, when there is floating yarn on the yarn in the defect image, this defect image is in an image set corresponding to the case where there is floating yarn on the yarn. If the position of the yarn guide hook is tilted in the defect image, this defect image may also be in an image set corresponding to the case where the position of the yarn guide hook is tilted.

Exemplarily, the pixels of the defect image can be compared with the pixels of the normal image, and the difference between the defect image and the normal image is obtained more precisely through the difference between the pixels of the defect image and the pixels of the normal image. Here, the pixels may be pixels at all positions in the image, or may be pixels at one or more positions in the image. For example, the pixels at the spinneret in the defect image and the normal image may be compared, to obtain the difference between the spinneret in the defect image and the spinneret in the normal image. If there are more objects to be cleaned at the spinneret in the defect image than the spinneret in the normal image, this defect image is in an image set corresponding to the case where there are more objects to be cleaned on the spinneret.

In one implementation, at least one defect detection model can correspond to at least one image set one by one, that is, using each image set for model training can obtain a defect detection model corresponding to a specific defect type. This defect detection model detects the second working image of the spinning box. Through this defect detection model, a defect detection model for whether the specific defect type exists in the second working image can be obtained. The specific defect type is a defect type corresponding to the image set for training. It can be understood that the training data of the defect detection model may also include images without the specific defect type, such as normal images or images corresponding to other defect types. According to the above implementation, the selection can be performed on a plurality of defect types according to the user requirement, and the defect type selected by the user can be trained to obtain a defect detection model. For example, the first sample data set includes an image set corresponding to the case where the position of the yarn guide hook is tilted and an image set corresponding to the case where the position of the oil nozzle is tilted. The user can choose to train the image set corresponding to the case where the position of the yarn guide hook is tilted, to obtain a defect detection model. By using this defect detection model to detect the second working image, it can be obtained whether the yarn guide hook of the spinning box corresponding to the second working image is tilted.

In one implementation, one defect detection model may correspond to all image sets, and the defect detection model detects the second working image of the spinning box. Through this defect detection model, it can be obtained whether the second working image has a defect, and the defect type of the defect can be obtained in the case where the defect exists. For example, the first sample data set includes an image set corresponding to the case where the position of the yarn guide hook is tilted and an image set corresponding to the case where the position of the oil nozzle is tilted. The model training may be performed using these image sets, to obtain a defect detection model. By using this defect detection model to detect the second working image, it can be obtained whether the yarn guide hook and oil nozzle of the spinning box corresponding to the second working image are tilted.

In one implementation, when the second working image is a defect image derived from the defect detection model, the defect type of the second working image and the confidence of the defect type may also be obtained through the defect detection model. The confidence of a defect type is used to represent the probability that the defect type of the second working image is this defect type. For example, the defect confidence of the spinneret may be the probability that the spinneret of the second working image has a defect.

According to the technical solution of the embodiments of the present disclosure, the first sample data set may include an image set of at least one defect type. When the second working image is a defect image, the defect type of the second working image can be obtained through the defect detection model, and the user can repair the spinning box corresponding to the second working image according to the defect type of the second working image, thus improving the repairment efficiency of the spinning box in the abnormal working state.

In some embodiments, the step of obtaining the first sample data set based on the at least one image set may include:

- for each image set in the at least one image set, clipping each image in the image set according to a defect type corresponding to the image set, to obtain a detection area image set corresponding to the image set; and
- obtaining the first sample data set based on at least one detection area image set corresponding to the at least one image set one by one.

In an embodiment of the present disclosure, the detection area image set may include a set of images of the detection area after clipping each image in the image set, and the detection area includes defect type areas corresponding to the image set and all images in the image set. Here, the clipping operation may be retaining only an area of a specific defect type in the image and removing other parts. Exemplarily, the defect type corresponding to the image set is the tilted position of the oil nozzle, and then the detection area is the position of the oil nozzle in each image in the image set. The position image of the oil nozzle in each image in the image set may be clipped, to obtain the detection area image set.

Exemplarily, the pixels of the detection area of each image in the image set may be clipped, to obtain the detection area image set corresponding to the defect type of the image set more accurately.

According to the technical solution of the embodiments of the present disclosure, by clipping each image in the image set according to the defect type corresponding to the image set, only the detection area image set corresponding to the image set can be trained to obtain the defect detection model, thus reducing the computational power required to obtain the defect detection model through training, and lowering the training cost of the defect detection model.

In some embodiments, the method for processing sample data further includes:

- determining a second sample data set from the first sample data set based on a feature quantity of each image in the first sample data set when a confidence of the defect detection model does not meet a second condition; and
- updating the defect detection model based on the second sample data set.

In an embodiment of the present disclosure, the confidence of the defect detection model may be determined based on the confidence that the second working image is a normal image, the confidence of the defect image, or the confidence of the defect type of the defect image, etc. derived from the defect detection model. For example, if a mode has low confidence in the information outputted for one or more images, the model can be considered to have low confidence.

Alternatively, the confidence of the defect detection model can be determined using a verification image. For example, the images in the first sample data set can be divided into training images and verification images. The training images are used to train to obtain the defect detection model, and the verification images are used to verify whether the defect detection model can accurately discriminate the defects in the verification images. The confidence of the defect detection model is determined according to the proportion of accurate discrimination.

For example, when the confidence does not meet the second condition (for example, when the confidence is lower than a threshold), the feature quantity of each image can be determined according to the difference between the detection area of the image and the corresponding area of the normal image. For example, if the difference between the detection area of an image in the image set and the corresponding area of the normal image is relatively large, it is determined that the feature quantity of the image is relatively high. Thus, images with higher feature quantities can be selected from the first sample data set, to update the defect detection model.

According to the technical solution of the embodiments of the present disclosure, the defect detection model can be updated through the feature quantity of each image in the first sample data set, thus improving the detection accuracy of the defect detection model.

In some embodiments, the step of determining the second sample data set from the first sample data set based on the feature quantity of each image in the first sample data set may include:

clustering all images in the first sample data set to obtain a plurality of clusters;

for each cluster in the plurality of clusters, determining a target image in the cluster based on a feature quantity of each image in the cluster; and obtaining the second sample data set based on the target image in each cluster.

According to the above embodiments, the feature differences between the clusters are relatively large. The target image is selected according to the feature quantities of images in each cluster, so that the selected target images have obvious differences and high feature quantities, thereby further improving the quality of the second sample data set and accordingly improving the accuracy of the defect detection model.

According to an embodiment of the present disclosure, the present disclosure further provides an apparatus for processing sample data. FIG. 3 shows a schematic block diagram of the apparatus for processing sample data according to an embodiment of the present disclosure. As shown in FIG. 3, the apparatus for processing sample data includes:

an image obtaining module 310 configured to obtain a plurality of first working images of a spinning box;

a defect image determining module 320 configured to, for each first working image in the plurality of first working images, determine the first working image as a defect image of the spinning box when a difference between the first working image and a normal image of the spinning box meets a first condition; and a first sample processing module 330 configured to obtain a first sample data set based on all defect images in the plurality of first working images; where the first sample data set is used to train to obtain a defect detection model of the spinning box, and the defect detection model is used to detect whether a second working image of the spinning box has a defect.

Figure 4:
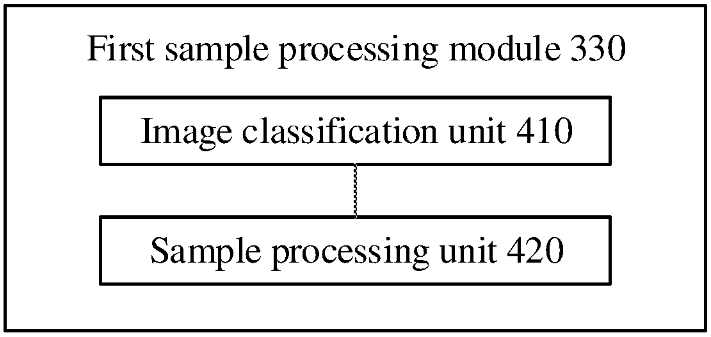
FIG. 4 is a schematic block diagram of an apparatus for processing sample data according to another embodiment of the present disclosure.

In some embodiments, as shown in FIG. 4, the first sample processing module 330 includes:

an image classification unit 410 configured to classify all the defect images according to at least one defect type, to obtain at least one image set corresponding to the at least one defect type one by one; and a sample processing unit 420 configured to obtain the first sample data set based on the at least one image set.

In some embodiments, the at least one defect type includes at least one of defects of a spinneret, a yarn, a yarn guide hook and an oil nozzle in the spinning box.

In some embodiments, the sample processing unit 420 is specifically configured to:

for each image set in the at least one image set, clip each image in the image set according to a defect type corresponding to the image set, to obtain a detection area image set corresponding to the image set; and obtain the first sample data set based on at least one detection area image set corresponding to the at least one image set one by one.

Figure 5:
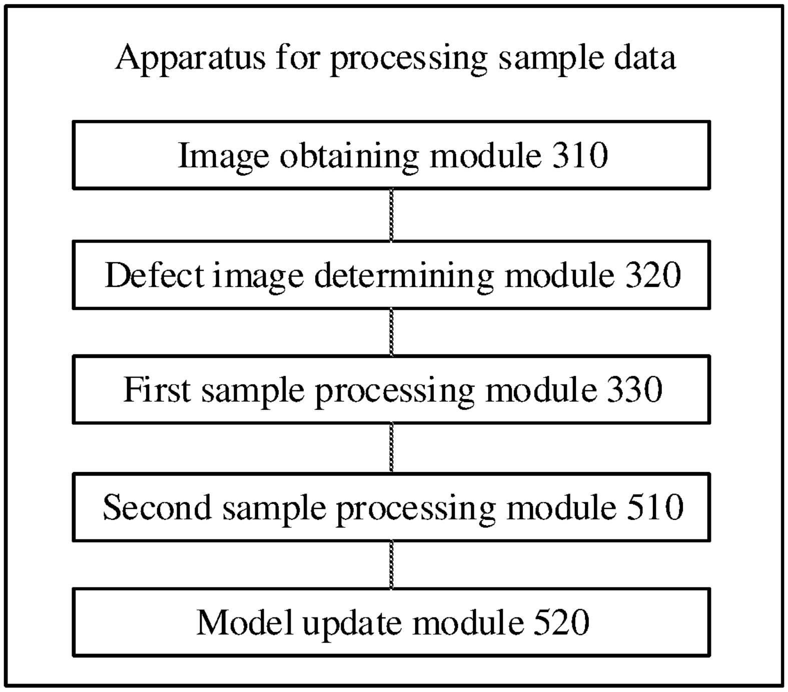
FIG. 5 is a schematic block diagram of an apparatus for processing sample data according to another embodiment of the present disclosure.

In some embodiments, as shown in FIG. 5, the apparatus for processing sample data further includes:

a second sample processing module 510 configured to determine a second sample data set from the first sample data set based on a feature quantity of each image in the first sample data set when a confidence of the defect detection model does not meet a second condition; and a model update module 520 configured to update the defect detection model based on the second sample data set.

In some embodiments, the second sample processing module 510 is specifically configured to:

cluster all images in the first sample data set to obtain a plurality of clusters;

for each cluster in the plurality of clusters, determine a target image in the cluster based on a feature quantity of each image in the cluster; and obtain the second sample data set based on the target image in each cluster.

Figure 6:
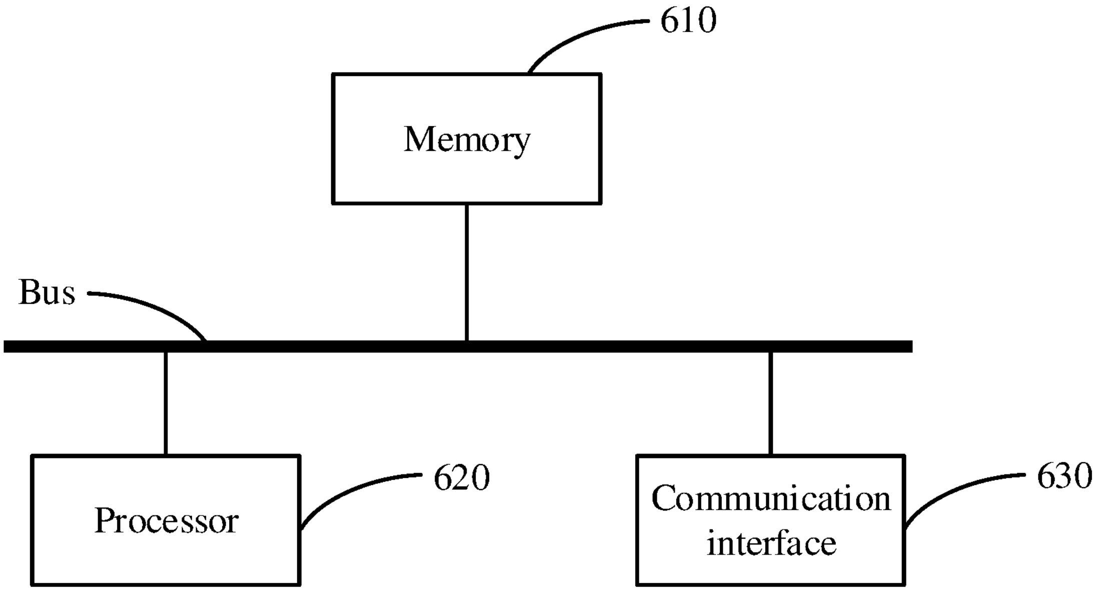
FIG. 6 is a block diagram of an electronic device used to implement a method for processing sample data according to an embodiment of the present disclosure.

FIG. 6 is a structural block diagram of an electronic device according to an embodiment of the present disclosure. As shown in FIG. 6, the electronic device includes: a memory 610 and a processor 620, and the memory 610 stores a computer program that can run on the processor 620. There may be one or more memories 610 and processors 620. The memory 610 may store one or more computer programs, and the one or more computer programs cause the electronic device to perform the method provided in the above method embodiment, when executed by the electronic device. The electronic device may also include: a communication interface 630 configured to communicate with an external device for data interactive transmission.

If the memory 610, the processor 620 and the communication interface 630 are implemented independently, the memory 610, the processor 620 and the communication interface 630 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the bus is represented by only one thick line in FIG. 6, but this thick line does not represent only one bus or only one type of bus.

Optionally, in a specific implementation, if the memory 610, the processor 620 and the communication interface 630 are integrated on one chip, the memory 610, the processor

620 and the communication interface 630 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A method for processing sample data, comprising:

obtaining a plurality of first working images of a spinning box;

for each first working image in the plurality of first working images, determining the first working image as a defect image of the spinning box in a case where a difference between the first working image and a normal image of the spinning box satisfies a first condition;

obtaining a first sample data set based on all defect images in the plurality of first working images; wherein the first sample data set is used to train a defect detection model of the spinning box, and the defect detection model is used to detect whether a second working image of the spinning box has a defect;

determining a second sample data set from the first sample data set based on a feature quantity of each image in the first sample data set in a case where a confidence of the defect detection model does not satisfy a second condition, by:

clustering all images in the first sample data set to obtain a plurality of clusters;

for each cluster in the plurality of clusters, determining a target image in the cluster based on a feature quantity of each image in the cluster; and obtaining the second sample data set based on the target image in each cluster; and updating the defect detection model based on the second sample data set.

2. The method of claim 1, wherein obtaining the first sample data set based on all defect images in the plurality of first working images, comprises:

classifying all the defect images according to at least one defect type, to obtain at least one image set corresponding to the at least one defect type one by one; and obtaining the first sample data set based on the at least one image set.

3. The method of claim 2, wherein the at least one defect type comprises at least one of defects of a spinneret, a yarn, a yarn guide hook and an oil nozzle in the spinning box.

4. The method of claim 2, wherein obtaining the first sample data set based on the at least one image set, comprises:

for each image set in the at least one image set, clipping each image in the image set according to a defect type corresponding to the image set, to obtain a detection area image set corresponding to the image set; and obtaining the first sample data set based on at least one detection area image set corresponding to the at least one image set one by one.

5. An electronic device, comprising:

at least one processor; and a memory connected in communication with the at least one processor;

wherein the memory stores an instruction executable by the at least one processor, and the instruction, when executed by the at least one processor, enables the at least one processor to execute:

obtaining a plurality of first working images of a spinning box;

for each first working image in the plurality of first working images, determining the first working image as a defect image of the spinning box in a case where a difference between the first working image and a normal image of the spinning box satisfies a first condition;

obtaining a first sample data set based on all defect images in the plurality of first working images; wherein the first sample data set is used to train a defect detection model of the spinning box, and the defect detection model is used to detect whether a second working image of the spinning box has a defect;

determining a second sample data set from the first sample data set based on a feature quantity of each image in the first sample data set in a case where a confidence of the defect detection model does not satisfy a second condition, by:

clustering all images in the first sample data set to obtain a plurality of clusters;

for each cluster in the plurality of clusters, determining a target image in the cluster based on a feature quantity of each image in the cluster; and obtaining the second sample data set based on the target image in each cluster; and updating the defect detection model based on the second sample data set.

6. The electronic device of claim 5, wherein obtaining the first sample data set based on all defect images in the plurality of first working images, comprises:

classifying all the defect images according to at least one defect type, to obtain at least one image set corresponding to the at least one defect type one by one; and obtaining the first sample data set based on the at least one image set.

7. The electronic device of claim 6, wherein the at least one defect type comprises at least one of defects of a spinneret, a yarn, a yarn guide hook and an oil nozzle in the spinning box.

8. The electronic device of claim 6, wherein obtaining the first sample data set based on the at least one image set, comprises:

for each image set in the at least one image set, clipping each image in the image set according to a defect type corresponding to the image set, to obtain a detection area image set corresponding to the image set; and obtaining the first sample data set based on at least one detection area image set corresponding to the at least one image set one by one.

9. A non-transitory computer-readable storage medium storing a computer instruction thereon, wherein the computer instruction is used to cause a computer to execute:

obtaining a plurality of first working images of a spinning box;

for each first working image in the plurality of first working images, determining the first working image as a defect image of the spinning box in a case where a difference between the first working image and a normal image of the spinning box satisfies a first condition;

obtaining a first sample data set based on all defect images in the plurality of first working images; wherein the first sample data set is used to train a defect detection model of the spinning box, and the defect detection model is used to detect whether a second working image of the spinning box has a defect;

determining a second sample data set from the first sample data set based on a feature quantity of each image in the first sample data set in a case where a confidence of the defect detection model does not satisfy a second condition, by:

clustering all images in the first sample data set to obtain a plurality of clusters;

for each cluster in the plurality of clusters, determining a target image in the cluster based on a feature quantity of each image in the cluster; and obtaining the second sample data set based on the target image in each cluster; and updating the defect detection model based on the second sample data set.

10. The non-transitory computer-readable storage medium of claim 9, wherein obtaining the first sample data set based on all defect images in the plurality of first working images, comprises:

classifying all the defect images according to at least one defect type, to obtain at least one image set corresponding to the at least one defect type one by one; and obtaining the first sample data set based on the at least one image set.

11. The non-transitory computer-readable storage medium of claim 10, wherein the at least one defect type comprises at least one of defects of a spinneret, a yarn, a yarn guide hook and an oil nozzle in the spinning box.

12. The non-transitory computer-readable storage medium of claim 10, wherein obtaining the first sample data set based on the at least one image set, comprises:

for each image set in the at least one image set, clipping each image in the image set according to a defect type corresponding to the image set, to obtain a detection area image set corresponding to the image set; and obtaining the first sample data set based on at least one detection area image set corresponding to the at least one image set one by one.

* * * * *